United States Patent
Kao et al.

(10) Patent No.: US 8,694,772 B2
(45) Date of Patent: Apr. 8, 2014

(54) METHOD AND SYSTEM FOR MANAGING NETWORK IDENTITY

(75) Inventors: Min-Chih Kao, Taipei (TW); Ya-Wen Lee, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 1201 days.

(21) Appl. No.: 12/254,817

(22) Filed: Oct. 20, 2008

(65) Prior Publication Data

US 2010/0031030 A1  Feb. 4, 2010

(30) Foreign Application Priority Data

Aug. 4, 2008 (TW) .............................. 97129549 A

(51) Int. Cl.
*H04L 9/00* (2006.01)
*H04L 9/32* (2006.01)
*H04L 29/06* (2006.01)

(52) U.S. Cl.
CPC .......... *H04L 9/3268* (2013.01); *H04L 63/0892* (2013.01); *H04L 2209/80* (2013.01)
USPC ....................................................... 713/156

(58) Field of Classification Search
CPC ............ H04L 2209/80; H04L 63/0892; H04L 9/3268
USPC ................... 713/155, 156, 158, 160
See application file for complete search history.

(56) References Cited

U.S. PATENT DOCUMENTS

| | | | |
|---|---|---|---|
| 5,982,898 A | 11/1999 | Hsu et al. | |
| 6,233,341 B1 * | 5/2001 | Riggins ......................... | 380/277 |
| 6,856,800 B1 | 2/2005 | Henry et al. | |
| 7,340,600 B1 * | 3/2008 | Corella ......................... | 713/155 |
| 7,849,008 B1 * | 12/2010 | Ekker et al. ..................... | 705/40 |
| 7,933,596 B2 * | 4/2011 | Bengtsson .................... | 455/433 |
| 2001/0032310 A1 * | 10/2001 | Corella ......................... | 713/156 |
| 2006/0286967 A1 * | 12/2006 | Lee et al. ...................... | 455/411 |
| 2009/0037728 A1 * | 2/2009 | Kamikura ..................... | 713/156 |

FOREIGN PATENT DOCUMENTS

| | | |
|---|---|---|
| CN | 1716856 | 1/2006 |
| TW | 200726170 | 7/2007 |
| WO | 99/35783 | 7/1999 |
| WO | 02/063847 | 8/2002 |
| WO | 2005/027560 | 3/2005 |
| WO | 2007099608 | 9/2007 |

OTHER PUBLICATIONS

Adrangi et al., RFC 4372 Jan. 2006.*

(Continued)

*Primary Examiner* — Saleh Najjar
*Assistant Examiner* — Oleg Korsak
(74) *Attorney, Agent, or Firm* — Jianq Chyun IP Office

(57) ABSTRACT

A method and a system for managing network identity are provided. The method and the system realize a management mechanism of temporary identification (ID) and real ID, which simultaneously achieves functionalities such as anonymity, accounting, and authorization. A short-term certificate and a corresponding public/private key pair are used to protect a temporary ID usable for accounting. This protection prevents the temporary ID from theft. The user generates a digital signature in the reply to a charge schedule statement from the visited network. This procedure is incorporated into an existing authentication framework based on Transport Layer Security (TLS) in order to provide an undeniable payment mechanism. The payment mechanism is applicable in an environment of multiple network operators and reduces the difficulty of integrating network operators. The method and the system do not have to consult a certificate revocation list (CRL) for authentication and thus are able to shorten authentication time.

24 Claims, 3 Drawing Sheets

(56) References Cited

OTHER PUBLICATIONS

Article titled "Intranet Security Framework Based on Short-lived Certificates" by HSU et al., 1997 IEEE, pp. 228-233.
Article titled "Roaming Key based Fast Handover in WLANs" authored by PRASAD et al., IEEE Communications Society / WCNC 2005, pp. 1570-1576.
Wireless Transport Layer Security Version Apr. 6, 2001, Wireless Application Protocol WAP-261-WTLS-20010406-a, Copyright 2001 Wireless Application Protocol Forum Ltd. pp. 1-106.
"WPKI, WAP-217-WPKI,Version Apr. 24, 2001" Wireless Application Protocol Public Key Infrastructure Definition Copyright Wireless Application Forum, Ltd. 2001. pp. 1-46.
This document specifies an Internet standards track protocol for the Internet community, "Internet Official Protocol Standards" Copyright (C) The Internet Society (2006). authored by Adrangi, et al., pp. 1-8.
"First Office Action of China Counterpart Application", issued on Apr. 20, 2011, p. 1-p. 5, in which the listed references were cited.
"Office Action of Taiwan Counterpart Application", issued on Nov. 19, 2012, p. 1-p. 8, in which the listed reference was cited.

* cited by examiner

METHOD AND SYSTEM FOR MANAGING NETWORK IDENTITY

CROSS-REFERENCE TO RELATED APPLICATION

This application claims the priority benefit of Taiwan application serial no. 97129549, filed on Aug. 4, 2008. The entirety of the above-mentioned patent application is hereby incorporated by reference herein and made a part of this specification.

BACKGROUND OF THE INVENTION

1. Field of the Invention

The present invention relates to an untrackable method and system for managing network identity.

2. Description of Related Art

Currently, there are many wireless technologies, such as Worldwide Interoperability for Microwave Access (WiMax) and Wireless Local Area Network (WLAN), which utilize Extensible Authentication Protocol (EAP) structure. FIG. 1 is a schematic diagram of a conventional EAP authentication model including three roles, wherein a mobile device 101 is equivalent to a supplicant, an access point 102 (AP) is equivalent to an authenticator, and an authentication, authorization, and accounting server (abbreviated as AAA server) 103 is equivalent to an authentication server. When a user wishes to use the mobile device 101 to connect to a network, he has to provide an identification (ID) to the access point 102, and then the access point 102 transmits the ID to the AAA server 103 so as to perform authentication, authorization, and accounting operations based on the user's identity.

The authentication model in FIG. 1 assumes that the three roles are all on a same network operated by a same network operator or a same Internet Service Provider (ISP). However, EAP may in fact be applied on an inter-domain network, as shown in FIG. 2. Three networks are illustrated in FIG. 2, a home network 230 which the user originally established an account, a visited network 210 which the user wishes to connect, and a proxy network 220 between the said two networks. The above three networks are respectively operated by different network operators or ISPs.

When the user wishes to connect to the visited network 210, he has to use the mobile device 201 to provide an ID to the access point 211 of the visited network 210. The visited network 210 does not have data about the user's identity but the home network 230 does. Therefore, the access point 211 has to transmit the ID all the way to an AAA server 231 of the home network 230 for authentication, authorization, and accounting. The access point 211 and an AAA server 212 of the visited network 210 and an AAA server 221 of the proxy network 220 merely relay packets in between and do not participate in the process of authentication between the mobile device 201 and the AAA server 231.

With more and more emphasis being placed on privacy, users generally wish to use temporary IDs on an untrustworthy network environment to prevent network position and privacy (e.g. the websites which are visited) from being disclosed. The issue of privacy is more important in the above-mentioned untrustworthy network environment which may refer in general to all the visited networks outside of the home network, especially a public wireless area network environment where malicious fake access points may exist.

The privacy issue in a same network domain may be solved by using Extensible Authentication Protocol-Tunneled Transport Layer Security (EAP-TTLS) or Protected Extensible Authentication Protocol (PEAP). However, in a cross-domain environment as shown in FIG. 2, the current EAP may not be enough to solve the problem. For privacy, the mobile device 201 may use an anonymous temporary ID and Extensible Authentication Protocol-Transport Layer Security (EAP-TLS) or EAP-TTLS to establish a secure channel with the AAA server 231 of the home network and then transmit an encrypted real ID to the AAA server 231 for authentication. However, this way, the AAA server 212 of the visited network in between is not able to decode the encrypted real ID of the user and thus can not perform accounting and authorization.

Because the EAP structure can not provide functionalities of privacy protection, accounting, and authorization at the same time, Internet Engineering Task Force (IETF) proposed RFC 4372 standard to solve this problem. A chargeable user identity (CUI) is introduced in this standard to add a new field in an EAP packet to carry a temporary ID for ISP charges. However, the CUI still has a few problems. For example, the CUI is only for temporary use. If the CUI is used for a long period of time, it may still be used to identify the user. Only the ISP that issues the user's real ID knows the corresponding relationship between the CUI and the real ID. Thus, the CUI has to be transmitted in plain text so that the network operator of the visited network may use the CUI to charge a fee from the ISP of the user's home network. This is because EAP lacks an effective mechanism to manage the CUI.

SUMMARY OF THE INVENTION

Exemplary embodiments consistent with the present invention provide a method and system for managing network identity which are used to manage temporary IDs and real IDs of users and may provide functionalities of anonymity, accounting, and authorization at the same time.

Exemplary embodiments consistent with the present invention provide a method for managing network identity. The method includes the following steps. First, a mobile device applies for a first short-term certificate from an ID management server (IMS). The first short-term certificate includes a temporary ID of a user of the mobile device. Then, the mobile device uses the temporary ID to log into a visited network to which an authentication device belongs and uses the first short-term certificate to establish a secure channel with the authentication device. The mobile device uses the visited network through the secure channel. All network packets sent from the mobile device are relayed by the authentication device.

Exemplary embodiments consistent with the present invention further provide a system for managing network identity. The system includes a mobile device, an authentication device, and an ID management server. The mobile device applies for a first short-term certificate from the ID management server. The first short-term certificate includes a temporary ID of a user of the mobile device. The mobile device uses the temporary ID to log into a visited network to which the authentication device belongs and uses the first short-term certificate to establish a secure channel with the authentication device. The mobile device uses the visited network through the secure channel. All network packets sent from the mobile device are relayed by the authentication device.

In order to make the aforementioned features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The method and system for managing network identity of the exemplary embodiments consistent with present invention realize a mechanism for managing temporary IDs and real IDs and provide functionalities such as anonymity, accounting, and authorization at the same time. In addition, the present invention may protect IDs from being falsely assumed, reduce risks of falsely incurred charges, lower the difficulty of integrating network operators, and speed up authentication of users.

Figure 1:
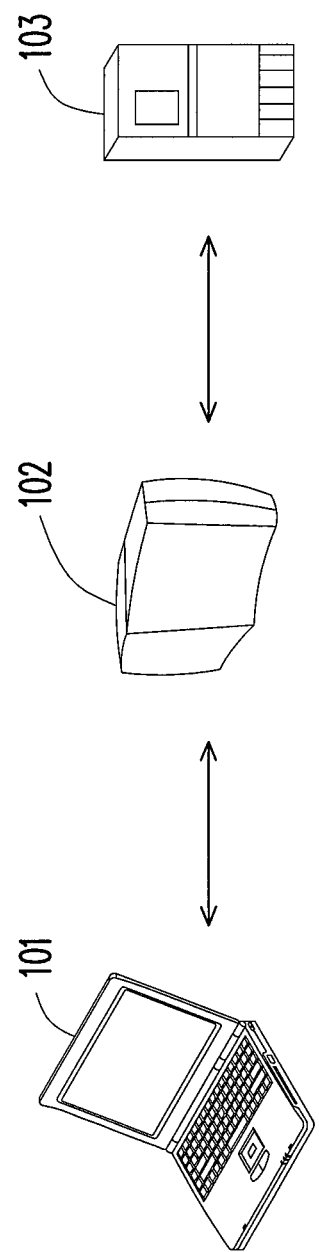
FIG. 1 is a schematic diagram of a conventional EAP authentication model including three roles.
Figure 2:
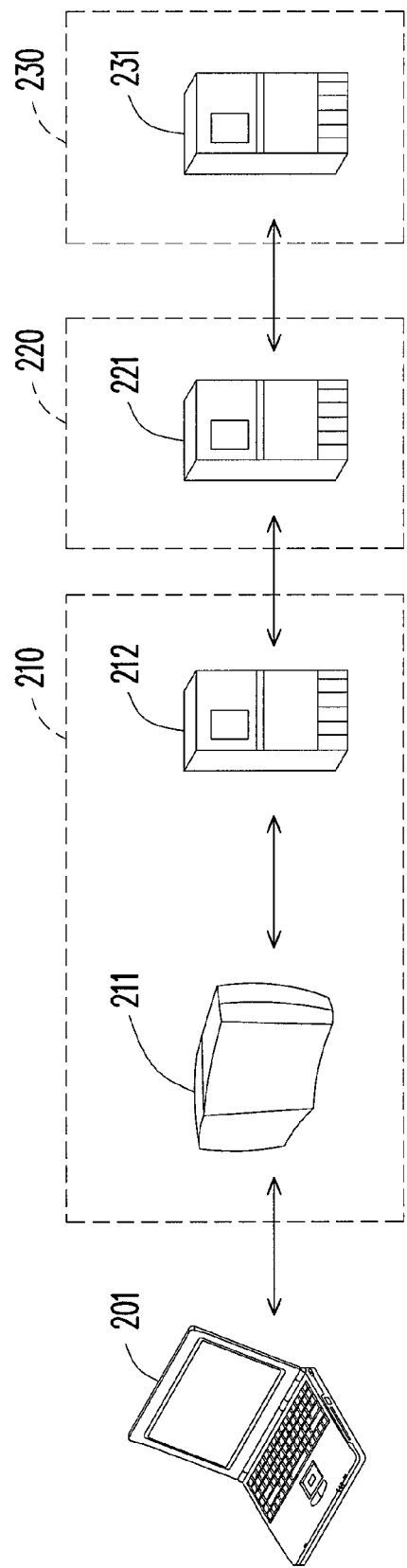
FIG. 2 is a schematic diagram of a conventional AAA cross network application.
Figure 3:
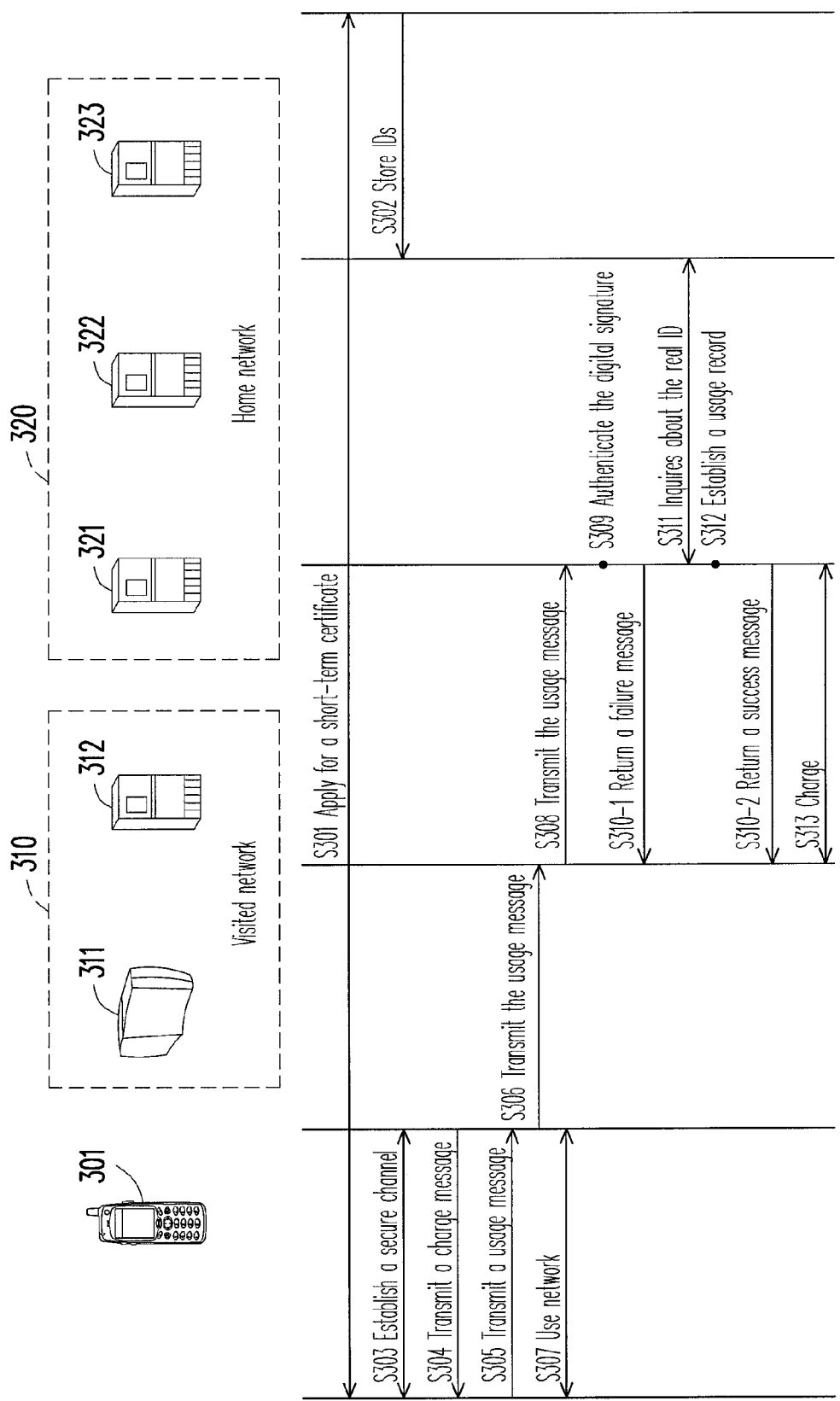
FIG. 3 is a flow chart of a method for managing network identity according to an exemplary embodiment of the present invention.

In one exemplary embodiment, FIG. 3 illustrates a system for managing network identity and the flow of process of the method for managing network identity which the system executes. The system for managing network identity of the present embodiment includes a mobile device 301, an access point (authentication device) 311, AAA servers (also referred to as accounting servers) 312 and 321, an ID recorder (IDR) 322, and an ID management server (IMS) 323. The above-mentioned six network apparatus are connected through a network. The access point 311 and the AAA server 312 belong to a visited network 310. The AAA server 321, the ID recorder 322, and the ID management server 323 belong to a home network 320 which the user originally established an account. The home network 320 and the visited network 310 are operated by different network operators or ISP providers.

The mobile device 301 is a device which the user uses to connect to a network and may be a mobile phone, a personal digital assistant (PDA), a notebook computer, or other mobile electronics that may connect to a wired or wireless network. The function of the access point 311 is to authenticate the user's identity and relay all network packets of the mobile device 301. In the present embodiment, the mobile device 301 connects to a wireless network so the access point 311 is used to authenticate the user. In another embodiment of the present invention, the mobile device 301 may connect to a wired network. Then, the access point 311 may be replaced with other authentication devices such as a switch or a router.

The visited network 310 uses the AAA server 312 to calculate charges. The home network 320 uses the AAA server 321 to confirm the user's identity and calculate charges. The ID recorder 322 is used to record corresponding relationship between temporary IDs and real IDs of users. The ID management server 323 is used to issue a short-term certificate of the user. The flow of process of the method for managing network identity in FIG. 3 is illustrated below step by step.

First, at step S301, the user may apply for the short-term certificate from the ID management server 323 of the home network 320 through the mobile device 301 before the user wishes to connect to the visited network 310. The short-term certificate includes a temporary ID of the user which enables the user to anonymously use the visited network 310. The temporary ID may be used to pay charges. The mobile device 301 may provide a user's original long-term certificate to apply for the short-term certificate from the ID management server 323. Alternatively, the mobile device 301 may provide the user's real ID and a password to apply for the short-term certificate from the ID management server 323.

The difference between the long-term certificate and the short-term certificate is the valid period. The long-term certificate has a longer valid period such as one or two years; the short-term certificate has a shorter valid period such as a half day or one day. The short-term certificate has to be re-applied periodically or every time before using the visited network. The long-term certificate is a certificate used in a conventional public key infrastructure (PKI) in which both parties not only have to authenticate each other but also have to look up a certificate revocation list (CRL) at a specific server to make sure that the other party's certificate is still valid. The short-term certificate is discarded after use and has a short valid period so it is relatively safe, has the effect of anonymity, and is not traceable. In addition, the valid period of the short-term certificate is very short so it is not required to look up the certificate revocation list when performing authentication, thereby simplifying management and maintenance.

After the mobile device 301 applies for the short-term certificate, at step S302, the ID management server 323 stores the temporary ID and the real ID of the user in the ID recorder 322 to prepare for future look-up.

Afterward, at step S303, the mobile device 301 uses the temporary ID in the short-term certificate to log into the visited network 310 through the access point 311. The access point 311 uses the short-term certificate the user obtained to authenticate the mobile device 301. The access point 311 also prepares a short-term certificate of itself for the mobile device to authenticate. The self-prepared short-term certificate of the access point 311 may be periodically issued to the access point 311 (i.e. the authentication device) by the AAA server 312 of the visited network 310 or may be periodically applied by the access point 311 from the AAA server 312. Then, the mobile device 301 and the access point 311 establish an encrypted secure channel using an Extensible Authentication Protocol—Transport Layer Security (abbreviated as EAP-TLS hereafter). Step S303 is similar to a conventional EAP-TLS but with two main differences. One difference is that the authentication process is moved from between the mobile device and the AAA server to between the mobile device and the access point. In other words, the access point 311 supports the authentication process of EAP-TLS such that the network transmission time may be reduced. The other difference is the use of the short-term certificate and not the conventional long-term certificate. The short-term certificate has a short valid period and hence does not have the concern of being deciphered and stolen. Both parties of the authentication process may directly trust each other without having to check the certificate revocation list, thereby reducing transmission time of the backbone network and authentication delay.

After establishing a secure channel, at step S304, the access point 311 transmits a charge message to the mobile device 301 to inform about the charge calculation schedule of using the visited network 310. Step S304 is for the user and the visited network 310 to negotiate a usage charge rate. For example, after the mobile device 301 receives the charge message, a dialog box explaining the charge calculation schedule may be displayed to inquire if the user accepts it. The mobile device 301 may also simultaneously display a plurality of charge calculation schedules in the dialog box for the user to choose or refuse.

At step S305, after the user accepts the usage charge rate of the visited network 310, the mobile device 301 transmits a responsive usage message to the access point 311. The usage message includes the user's short-term certificate and a digital signature indicating that the user accepts the charge calculation schedule. The access point 311 may use s public key in the user's short-term certificate to authenticate the user's digital signature. If the authentication passes, the user's identity may be confirmed. After the access point 311 authenticates the user's digital signature, as shown in step S307, the user may use the visited network 310 through the secure channel between the mobile device 301 and the access point 311. At step S306, the usage message is transmitted to the AAA server 312 through the access point 311. After the AAA server 312 authenticates the user's digital signature, a usage record may be established according to the usage message to record the time and charge of the user using the visited network 310.

Afterward, the AAA server 312 of the visited network 310 and the AAA server 321 of the home network 320 may perform a settlement regarding the abovementioned charge, as shown at step S308 to step S313. The settlement at step S308 to step S313 may be an online settlement or an off-line settlement. The online settlement is performed at the same time when the mobile device 301 uses the visited network 310, while the off-line settlement is performed after the mobile device 301 logs off the visited network 310. The off-line settlement may be performed periodically, for example, once a day or once a month.

As shown at step S308, the AAA server 312 transmits the usage message to the AAA server 321. The mobile device 301 generates and transmits the user's digital signature after the user accepts the usage charge of the visited network 310 so that the user can not deny having used the visited network 310. As a result, the visited network 310 may charge the home network 320 without needing to have a direct roaming agreement with the home network 320.

Next, at step S309, the AAA server 321 receives the usage message, wherein the short-term certificate includes the user's public key which is used by the AAA server 321 to authenticate the user's digital signature. If the digital signature does not pass the authentication, the AAA server 321 returns a failure message to the AAA server 312 at step S310-1.

If the digital signature passes the authentication, the AAA server 321, at step S311, inquires the user's real ID from the ID recorder 322 based on the user's temporary ID. If the real ID is looked up, the user's identity is confirmed. Next, the AAA server 321 establishes a record using the real ID at step S312 and then returns a success message to the AAA server 312 at step S310-2.

At step S313, the AAA server 312 of the visited network 310 may charge the AAA server 321 of the home network 320 for use of the visited network 310 after receiving the success message. The access point 311 may record the time that the user uses the visited network 310 based on the usage message transmitted by the mobile device 301. Then, the AAA server 312 may obtain the user's temporary ID and the time and charge that the user uses the visited network 310 from the access point 311 so as to charge the AAA server 321. The AAA server 321 has established a corresponding usage record at step S312 and may inquire the ID recorder 322 about the corresponding relationship between the temporary ID and the real ID so as to examine if the charge calculation schedule provided by the AAA server 312 is correct. The operator of the visited network must have the user's temporary ID and digital signature to calculate the charge and this prevents risks such as stolen IDs and overcharges.

In summary, the method and system for managing network identity of the present invention realize a mechanism for managing temporary IDs and real IDs and provide functionalities such as anonymity, accounting, and authorization at the same time.

A short-term certificate and a corresponding public/private key pair are used to protect a temporary ID usable for accounting. This protection prevents the temporary ID from theft.

In the present invention, the user generates a digital signature with respect to the usage charge explanation message from the visited network. This process incorporates the current EAP-TLS structure authentication method and achieves an undeniable accounting mechanism applicable in a cross domain network of multiple network operators. In addition, these operators do not need to have one-to-one business agreements and this reduces the difficulty of integrating network operators.

The method and system for managing network identity of the present invention do not require looking up the certificate revocation list. As a result, the authentication process only occurs between the mobile device of the user and the authentication device (e.g. an access point of a wireless area network). Therefore, the authentication time will not increase, which is advantageous for Voice over Internet Protocol (VoIP) or instant service of multimedia streaming.

It will be apparent to those of ordinary skills in the technical field that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for managing network identity (ID), comprising:
    a mobile device applying for a first short-term certificate from an ID management server, wherein the first short-term certificate includes a temporary ID of a user of the mobile device;
    the mobile device using the temporary ID to log into a visited network to which an authentication device belongs and using the first short-term certificate to establish a secure channel with the authentication device; and
    the mobile device using the visited network through the secure channel, wherein all network packets sent from the mobile device are relayed by the authentication device, and wherein the first short-term certificate is discarded after use and is re-applied every time before the mobile device uses the visited network.

2. The method for managing network identity according to claim 1, wherein the mobile device uses a long-term certificate to apply for the first short-term certificate from the ID management server, a valid period of the long-term certificate is longer than a valid period of the first short-term certificate, authentication of the long-tern certificate requires looking up a certificate revocation list, and authentication of the first short-term certificate does not require looking up the certificate revocation list.

3. The method for managing network identity according to claim 1, wherein the mobile device uses a real ID of the user and a password to apply for the first short-term certificate from the ID management server.

4. The method for managing network identity according to claim 1, wherein when establishing the secure channel, the authentication device authenticates the mobile device through the first short-term certificate, and the mobile device authenticates the authentication device through a second short-term certificate of the authentication device.

5. The method for managing network identity according to claim 4, wherein the second short-term certificate of the authentication device is periodically issued to the authentication device by a first accounting server or is applied periodically by the authentication device from the first accounting server.

6. The method for managing network identity according to claim 1, wherein the mobile device and the authentication device use Extensible Authentication Protocol-Transport Layer Security to establish the secure channel.

7. The method for managing network identity according to claim 1, further comprising:
   after establishing the secure channel, the mobile device transmitting a usage message to the authentication device, wherein the usage message includes the first short-term certificate and a digital signature of the user;
   the authentication device transmitting the usage message to a first accounting server after authenticating the digital signature; and
   the first accounting server receiving the usage message, authenticating the digital signature, and establishing a first usage record based on the usage message.

8. The method for managing network identity according to claim 7, wherein the step of the mobile device transmitting the usage message comprises:
   the authentication device transmitting a charge message to the mobile device to inform the user of a charge calculation schedule of the visited network; and
   the mobile device transmitting the usage message to the authentication device to indicate acceptance of the charge calculation schedule.

9. The method for managing network identity according to claim 7, further comprising:
   the first accounting server transmitting the usage message to a second accounting server;
   the second accounting server receiving the usage message and using the first short-term certificate to authenticate the digital signature;
   the second accounting server returning a failure message to the first accounting server if the digital signature does not pass authentication; and
   the second accounting server establishing a second usage record based on the usage message and returning a success message to the first accounting server if the digital signature passes authentication.

10. The method for managing network identity according to claim 9, wherein the step of the second accounting server authenticating the digital signature, the step of the second accounting server returning the failure message, the step of the second accounting server establishing the second usage record, and the step of the second accounting server returning the success message are all performed offline.

11. The method for managing network identity according to claim 9, further comprising:
   the ID management server storing the temporary ID and a real ID of the user in an ID recorder after the mobile device applies for the first short-term certificate; and
   the second accounting server inquiring about the real ID from the ID recorder based on the temporary ID and establishing the second usage record using the real ID after receiving the usage message.

12. The method for managing network identity according to claim 9, further comprising:
   the authentication device recording a time that the user uses the visited network based on the usage message; and
   the first accounting server obtaining the temporary ID and the time and charge of the user using the visited network from the authentication device so as to charge the second accounting server,
   wherein the second accounting server, the ID management server, and the ID recorder belong to a home network of the user, the authentication device and the first accounting server belong to the visited network, and the home network and the visited network are operated by different network providers.

13. A system for managing network identity (ID), comprising:
   a mobile device;
   an authentication device; and
   an ID management server, wherein
   the mobile device applies for a first short-term certificate from the ID management server, the first short-term certificate includes a temporary ID of a user of the mobile device,
   the mobile device uses the temporary ID to log into a visited network to which the authentication device belongs and uses the first short-term certificate to establish a secure channel with the authentication device,
   the mobile device uses the visited network through the secure channel, and all network packets sent from the mobile device are relayed by the authentication device, wherein the first short-term certificate is discarded after use and is re-applied every time before the mobile device uses the visited network.

14. The system for managing network identity according to claim 13, wherein the mobile device uses a long-term certificate to apply for the first short-term certificate from the ID management server, a valid period of the long-term certificate is longer than a valid period of the first short-term certificate, authentication of the long-term certificate requires looking up a certificate revocation list, and authentication of the first short-term certificate does not require looking up the certificate revocation list.

15. The system for managing network identity according to claim 13, wherein the mobile device uses a real ID of the user and a password to apply for the first short-term certificate from the ID management server.

16. The system for managing network identity according to claim 13, wherein when establishing the secure channel, the authentication device authenticates the mobile device through the first short-tee in certificate, and the mobile device authenticates the authentication device through a second short-term certificate of the authentication device.

17. The system for managing network identity according to claim 16, wherein the second short-term certificate of the authentication device is periodically issued to the authentication device by a first accounting server or is periodically applied by the authentication device from the first accounting server.

18. The system for managing network identity according to claim 13, wherein the mobile device and the authentication device use Extensible Authentication Protocol-Transport Layer Security to establish the secure channel.

19. The system for managing network identity according to claim 13, further comprising a first accounting server, wherein after establishing the secure channel, the mobile device transmits a usage message to the authentication device, the usage message includes the first short-term certificate and a digital signature of the user, the authentication device transmits the usage message to the first accounting server after authenticating the digital signature, and the first accounting server receives the usage message, authenticates the digital signature, and establishes a first usage record based on the usage message.

20. The system for managing network identity according to claim 19, wherein the authentication device transmits a charge message to the mobile device to inform about the charge calculation schedule of the visited network, and then the mobile device transmits the usage message to the authentication device to indicate acceptance of the charge calculation schedule.

21. The system for managing network identity according to claim 19, further comprising a second accounting server, wherein the first accounting server transmits the usage message to the second accounting server, the second accounting server receives the usage message and uses the first short-term certificate to authenticate the digital signature, the second accounting server returns a failure message to the first accounting server if the digital signature does not pass authentication, the second accounting server establishes a second usage record based on the usage message and returns a success message to the first accounting server if the digital signature passes authentication.

22. The system for managing network identity according to claim 21, wherein the second accounting server authenticates the digital signature, returns the failure message or the success message, and establishes the second usage record offline.

23. The system for managing network identity according to claim 21, further comprising an ID recorder, wherein after the mobile device applies for the first short-term certificate, the ID management server stores the temporary ID and a real ID of the user in the ID recorder, and the second accounting server inquires the ID recorder about the real ID based on the temporary ID and uses the real ID to establish the second usage record after receiving the usage message.

24. The system for managing network identity according to claim 21, wherein the authentication device records a time the user uses the visited network based on the usage message, the first accounting server obtains from the authentication device the temporary ID and the time and charge the user uses the visited network so as to charge the second accounting server; the second accounting server, the ID management server, and the ID recorder all belong to a home network of the user; the authentication device and the first accounting server belong to the visited network; the home network and the visited network are operated by different network operators.

\* \* \* \* \*